Figure 1:
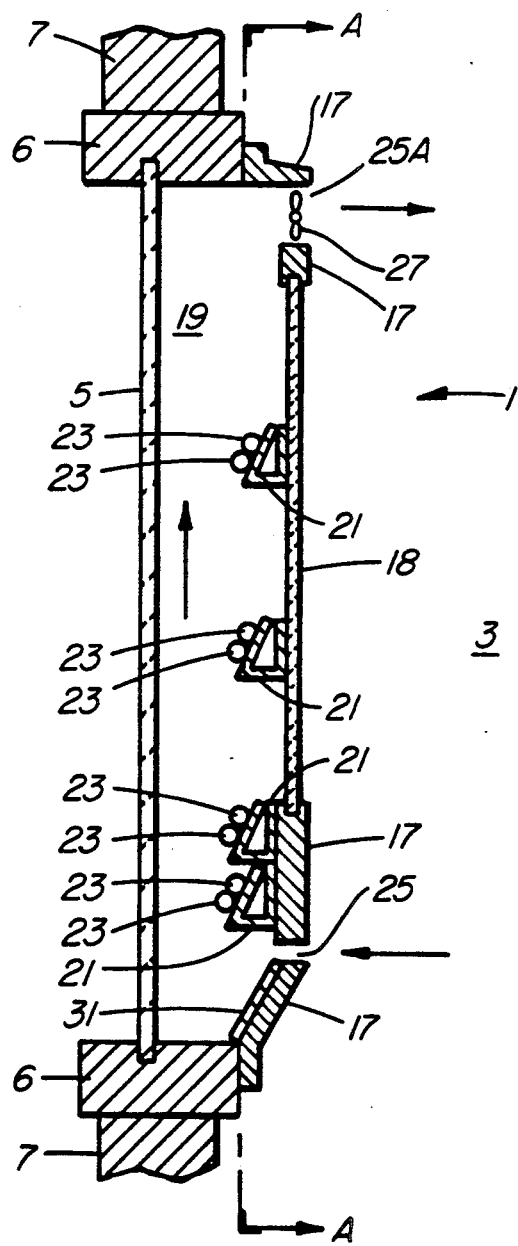

United States Patent [19]

MacKenzie

[11] Patent Number: 5,081,982
[45] Date of Patent: Jan. 21, 1992

[54] SOLAR WINDOW AIR HEATER

[76] Inventor: John A. MacKenzie, 812 Baseline Road, Ottawa, Ontario, Canada, K2C 0A3

[21] Appl. No.: 631,869

[22] Filed: Dec. 21, 1990

[30] Foreign Application Priority Data

Jan. 2, 1990 [CA] Canada .................................. 2006971

[51] Int. Cl.⁵ .............................................. E04D 13/18
[52] U.S. Cl. ...................... 126/429; 126/430
[58] Field of Search .............. 126/400, 429, 430, 437, 126/901, 449, 450, 422, 431

[56] References Cited

U.S. PATENT DOCUMENTS

| | | | |
|---|---|---|---|
| 3,990,635 | 11/1976 | Restle et al. | 126/429 |
| 4,232,731 | 11/1980 | Kaplow et al. | 126/901 |
| 4,353,353 | 10/1982 | Keller | 126/429 |
| 4,446,850 | 5/1984 | Zilisch | 126/430 |
| 4,534,335 | 8/1985 | Rice | 126/429 |

FOREIGN PATENT DOCUMENTS 73244 4/1985 Japan .................................. 126/430

Primary Examiner—James C. Yeung
Attorney, Agent, or Firm—Pascal & Associates

[57] ABSTRACT

A solar collector comprising a collector frame surrounding a transparent collector pane, the frame being mounted to the frame of an existing window inside a building, a plurality of narrow heat sinks fixed to opposite sides of the frame containing solar energy absorbing and retaining means, the heat sinks being spaced so as to allow significant amounts of solar illumination incident on the existing window to pass through the collector pane into the building, a lower port passing through the solar collector and located adjacent the bottom of the collector and an upper port passing through the solar collector adjacent the top of the collector, whereby air from the building can pass through the lower port into a space between the existing window and the collector pane, and out the upper port into the building, thereby heating the interior of the building.

12 Claims, 2 Drawing Sheets

SOLAR WINDOW AIR HEATER

This invention relates to a solar heat energy and more particularly to an add-on structure to an existing window of a building for collecting solar heat energy and producing heated air for supplemental heating of the building.

It is sometimes desirable to use solar heat energy for providing supplemental heating to a building. There are various types of solar heat energy collectors that produce solar heated air for this purpose. Many solar heat energy collectors include solar heat energy absorbers, which store heat that is later carried to a region to be heated.

In U.S. Pat. No. 4,212,292, issued July 15, 1980 to Solarein, Inc., a solar collector is described forming a wall of a house in which solar radiation is introduced into a chamber which contains a porous or fibrous heat absorbing and storing material. Air is circulated from the house through the chamber, carrying the stored heat into the house. Unfortunately the porous or fibrous heat absorbing material is thick and opaque, prohibiting use of the wall to introduce solar illumination into the house. For large collectors this creates a gloomy interior of the house, requiring supplemental lighting, which causes increased energy use, in direct contrast to the objective of conservation of remotely manufactured energy, a reason that the solar collector was created.

U.S. Pat. No. 4,327,795 issued May 4, 1982 to Everett T. Wheeler describes the use of an external casement window which is attached to the outside frame of a window. Contained within the casement is a group of finned hollow tubes covered on one side with a paint that absorbs solar heat. The top and bottom of the casement is in air communication with the interior of the house. Air is circulated into the house by convection. While the finned hollow tubes intercept the solar energy (light) to a very large degree and therefore virtually cover the transparent part of the window, there is some degree of light transmission into the house. However to use the Wheeler structure, modifications must be made to the house to allow air to circulate from the house, through a wall of the house into the casement, then from the casement back through a wall of the house into the house.

The present invention is an add-on solar collector to an existing window that circulates air therethrough from the house which requires no modification of the house, allows a significant amount of light transmission into the house, provides an appearance from the outside of the house that the window is protected by security bars, and heats substantial amounts of house air. In a preferred embodiment air is circulated therethrough under power which does not use any mains power. Further the operation of the circulating structure is self-regulating.

To achieve the above an embodiment of the present invention is a solar collector comprising a collector frame surrounding a transparent collector pane, mounted to the frame of an existing window inside a building. A plurality of heat sinks preferably comprised of sealed tubes containing heat retaining fluid and coated with heat absorbing material are fixed to opposite sides of the collector frame on its side adjacent the existing window so as to traverse the collector frame from one side of the frame to the other, and are spaced so that a significant proportion of light impinging on the existing window passes between the tubes and collector pane into the interior of the building. A lower port, preferably comprised of spaced holes, pass through the solar collector adjacent the bottom thereof, preferably through the frame. An upper port passes through the solar collector adjacent the top thereof. As a result air from the building can pass through the lower ports into a space between the existing window and the collector pane, and out the upper port into the building, thereby heating the interior of the building.

Preferably a fan is disposed adjacent the top or bottom port and is oriented to force air from the house into the space between the collector pane and window or from the space between the collector pane and window into the house. A solar battery is disposed between the solar collector and window at the bottom of the collector frame, angled to maximize exposure to the sun in winter time, and is connected to the fan through a thermostat.

Solar energy penetrating the existing window is absorbed by the heat sinks, and is stored in the heat retaining fluid. Via the heat sinks, the heat stored in the fluid heats the surrounding air, which increases in temperature. While the heated air enclosed between the existing window and collector pane increasing in temperature can circulate air and heat the building via the ports, in the preferred embodiment once the air reaches a predetermined temperature, such as 100° F., the thermostat closes, allowing solar energy impinging on the solar battery to power the fan, providing powered air circulation. At the same time sunlight passes between the heat sinks into the building through the collector pane, providing light for the interior, avoiding the requirement to utilize supplementary lighting energy in the building. No modification to the building is required, in contrast to the Wheeler design.

Figure 2:
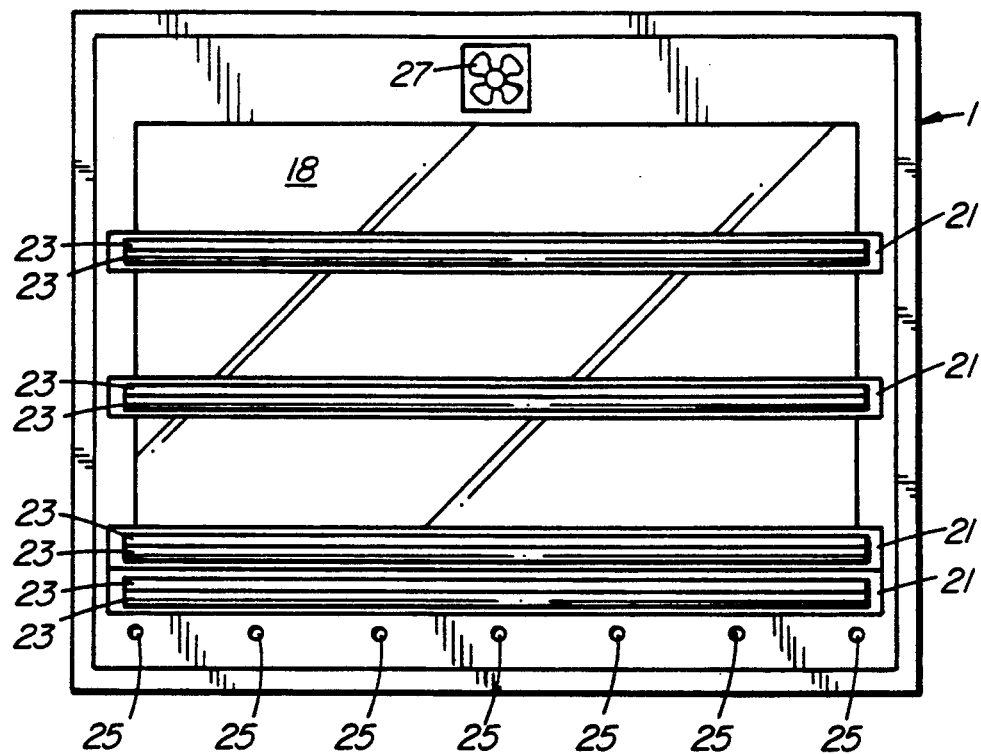
Figure 3:
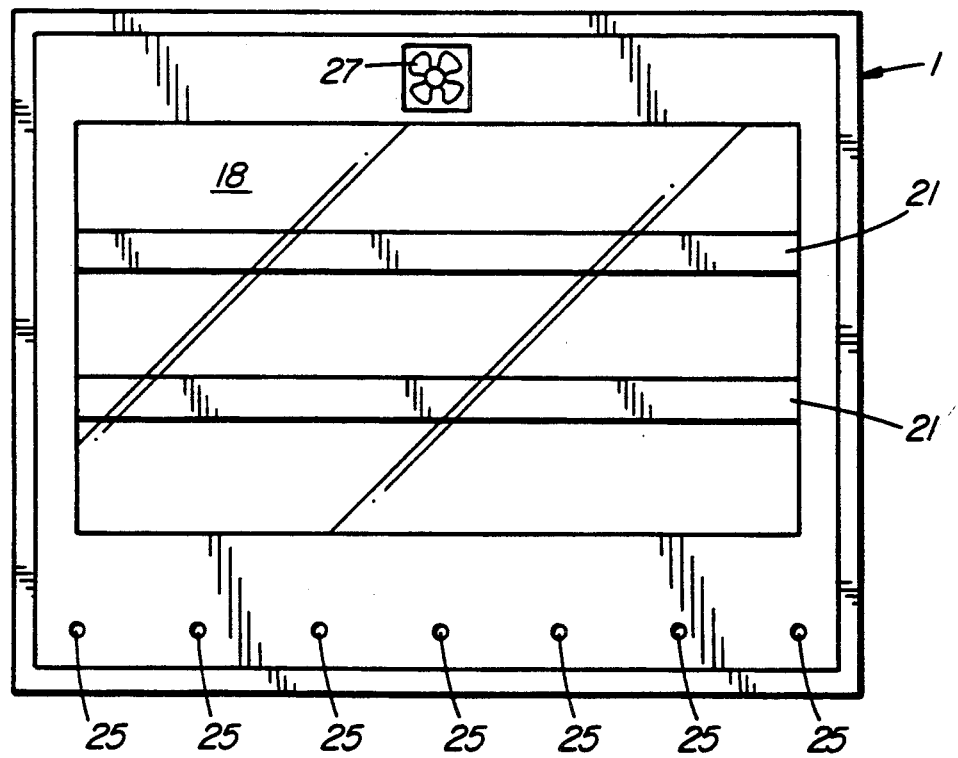

A better understanding of the present invention will be obtained with reference to the description below in conjunction with the following figures, in which:

FIG. 1 is a cross-sectional side view illustrating an existing window and a preferred embodiment of the invention, FIG. 2 is an elevational view illustrating the preferred embodiment of the present invention along section A—A of FIG. 1, and FIG. 3 is an elevational view illustrating the preferred embodiment of the present invention from the inside of the building facing the existing window.

With reference to the drawings, and in particular to FIG. 1, it will be seen that a preferred embodiment of an add-on structure 1 has been fixed to the indoor side of an existing window 5 of a building 7.

A collector frame 17 is mounted into and/or extends around, the indoor side of an existing window frame 6 that retains window 5. A transparent collector pane 18 is carried by the collector frame 17.

An enclosed space 19 is defined by the indoor side of the existing window 5, the frames 6 and 17, and the collector pane 18. Within the enclosed space 19 are horizontally oriented heat sinks mounted at each end to the frame 17. The heat sinks are comprised of heat absorbing tubes 23 which preferably are ½ inch diameter copper pipes, painted black, mostly filled with automotive antifreeze, (ethylene glycol) and partly filled with air to allow for the expansion of the antifreeze, which are mounted on heat conducting heat sinking supports 21, painted mat black. The supports 21 orient the heat absorbing tubes 23 at an angle that is preferably equal to the angle of incidence of the sun's rays during the coldest part of the winter and during a time of the day midway between the highest position of the sun and sunset and serve to both collect radiant energy from the sun and dissipate the heat stored in the fluid to the air in space 19. Also, due to possible roof overhangs of the building 7 which might shadow the structure several rows of heat sinks are located adjacent the bottom of the frame 17, where they would be least likely to be shadowed. The supports 21 are the structural members actually fixed to the frame 17 at their ends. Tubes 23 are attached using mounting hardware (not shown) to allow expansion and contraction, to supports 21. In a successful embodiment two supports 21 each supporting two tubes 23 traversed across the central portion of pane 18, with two further similar supports disposed across the bottom of the frame 17 where they were hidden behind the frame, as shown. Of course, the number of tubes used can be changed to suit the window size and desired heating capacity.

As shown in FIG. 2 and FIG. 3 air inlets 25 (ports) are spaced across and are adjacent the bottom of the frame 17. As shown in FIG. 1 a port 25A to accommodate a fan is located adjacent the top of the frame 17. An electrical fan 27 is positioned at the top of the frame 17 so as to blow heated air out of the space between the existing window 5 and the collector pane 18 through port 25A. A fan that was used in a successful prototype had a rated capacity of 27.0 cfm at 9 volts DC.

A solar battery 31 is positioned at the bottom of the frame 17, angled similarly to supports 21. The solar battery 31 is connected in series with the electrical fan 27 and a thermostat (not shown). The location of the solar battery, while shown at the bottom of the frame 17, can alternatively be along the sides of the frame 17 or at any non-obtrusive location where it can be exposed to the sun. The solar battery in a successful embodiment was rated at 9 volts DC. A rechargeable battery can be used in addition, charged by the solar battery, to power the fan and drive remaining heat to the building after sundown.

In operation, the heat absorbing tubes 23 and heat sinking supports 21 absorb solar energy from the sun's solar rays which is stored as heat energy in the anti-freeze contained in the tubes 23. This stored heat is simultaneously, or after sundown, conducted to heat sinking supports 21, which heat up with tubes 23. The heat sinks dissipate to the air in enclosed space 19 the heat absorbed by the anti-freeze in tubes 23. The thermostat senses the temperature of the air in the enclosed space 19, and when the temperature exceeds a predetermined temperature (for example, 100° F.), the thermostat switch closes. The circuit from the solar battery 31 to the fan is thereby switched to provide electrical power to the electrical fan 27 which blows the heated air from the enclosed space 19 into the building. Replacement air is introduced into the enclosed space 19 through air inlets 25.

The temperature of the heated air passing out of the port 25A into the building 7 has been found to stabilize after a period of time to a temperature which is close to the temperature of hot air typically found at a hot air exit vent of a furnace which is used to heat residential housing.

The pane 18 carried by the frame 17 in addition reduces heat loss from the building, as it forms the equivalent of a double glazed window where only a single pane would be otherwise used, or a triple glazed window where double glazing would otherwise be used.

As may be appreciated from FIGS. 2 and 3, the window of the house using this invention would appear to an outsider to be barred, discouraging forced entry by criminals. The invention can be manufactured with a variable width frame, so that it may be adjusted to fit a variety of sizes of window frames. The benefit of solar heating of a building is thus obtained using existing windows, with retention of a large proportion of incident solar illumination of the interior of the building, while no modification of the existing building is necessary to obtain circulation and heating of building air.

The structure can of course be adapted for use with residential housing, mobile homes, industrial and office buildings, etc.

A person skilled in the art understanding this invention may now conceive of other embodiments or variations in design. All such variations or other embodiments using the principles of this invention are considered to be within the sphere and scope of this invention as defined in the claims appended hereto.

I claim:

1. A solar collector comprising a collector frame surrounding a transparent collector pane, the collector frame being mounted to the frame of an existing window inside a building, a plurality of narrow heat sinks fixed to opposite sides of the collector frame containing solar energy absorbing and retaining means, the heat sinks being spaced so as to allow significant amounts of solar illumination incident on the existing window to pass through the collector pane into the building, a lower port passing through the solar collector and located adjacent the bottom of the collector and an upper port passing through the solar collector adjacent the top of the collector, whereby air from the building can pass through the lower port into a space between the existing window and the collector pane, and out the upper port into the building, thereby heating the interior of the building.

2. A solar collector as defined in claim 1 in which the lower port is positioned below the lower-most heat sink.

3. A solar collector as defined in claim 2 in which the upper port is positioned above the upper-most heat sink.

4. A solar collector as defined in claim 3 in which the ports extend through the collector frame.

5. A solar collector as defined in claim 4 further including a solar battery fixed between the existing window and the collector frame having its active surface angled for exposure to solar energy, a fan disposed adjacent one of the upper and lower ports, and a thermostat located between the window and collector pane and physically isolated from the heat sink, the battery, thermostat and fan being connected in a series circuit, whereby with the incidence of solar energy on the battery and raising of the temperature of the air between the window and collector pane to a predetermined raised temperature, the fan is powered to drive building air through said ports and the space between the window and collector pane, heating it by contact with the heat sinks.

6. A solar collector as defined in claim 5 in which the fan is located at the top-most port and is positioned relative thereto for drawing heated air out of the solar collector and into the building.

7. A solar collector as defined in claim 5 in which the solar energy absorbing and retaining means is comprised of copper tubes having a black surface and partly filled with ethylene qlycol.

8. A solar collector as defined in claim 5 in which the collector frame has variable width and/or height.

9. A solar collector as defined in claim 3 in which the solar energy absorbing and retaining means is comprised of copper tubes having a black surface and partly filled with ethylene glycol.

10. A solar collector as defined in claim 3 in which the collector frame has variable width and/or height.

11. A solar collector as defined in claim 1 in which the solar energy absorbing and retaining means is comprised of copper tubes having a black surface and partly filled with ethylene glycol.

12. A solar collector as defined in claim 1 in which the collector frame has variable width and/or height.

* * * * *